US008829710B2

(12) United States Patent
Takahashi et al.

(10) Patent No.: US 8,829,710 B2
(45) Date of Patent: Sep. 9, 2014

(54) STARTER DRIVING SEMICONDUCTOR SWITCH APPARATUS

(75) Inventors: Yasuhiro Takahashi, Chiyoda-ku (JP); Takaaki Tanaka, Chiyoda-ku (JP); Toru Kubo, Minato-ku (JP); Toshiaki Hata, Chiyoda-ku (JP); Hideki Umemoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 945 days.

(21) Appl. No.: 12/962,390

(22) Filed: Dec. 7, 2010

(65) Prior Publication Data

US 2011/0298276 A1 Dec. 8, 2011

(30) Foreign Application Priority Data

Jun. 7, 2010 (JP) ................. 2010-129839

(51) Int. Cl.
| | |
|---|---|
| B60R 22/00 | (2006.01) |
| F02P 9/00 | (2006.01) |
| H02G 3/00 | (2006.01) |
| F02N 11/08 | (2006.01) |
| F02N 11/10 | (2006.01) |

(52) U.S. Cl.
CPC ............ F02N 11/0825 (2013.01); F02N 11/10 (2013.01); F02N 11/0818 (2013.01); F02N 11/087 (2013.01); Y02T 10/48 (2013.01)
USPC ...................................... 307/10.6

(58) Field of Classification Search
USPC .................. 307/10.3, 10.6; 123/179.1, 179.3; 361/90
See application file for complete search history.

(56) References Cited

U.S. PATENT DOCUMENTS 6,104,157 A * 8/2000 Kramer et al. ................ 318/445
2009/0206965 A1 8/2009 Niimi

FOREIGN PATENT DOCUMENTS

| JP | 2001-236871 A | 8/2001 |
| JP | 2004-297866 A | 10/2004 |
| JP | 2009-224315 A | 10/2009 |

OTHER PUBLICATIONS

Official Action issued in Japanese Patent Application No. 2010-129839 dated Jan. 31, 2012.

* cited by examiner

*Primary Examiner* — Carlos Amaya
(74) *Attorney, Agent, or Firm* — Sughrue Mion, PLLC (57) ABSTRACT

A starter driving semiconductor switch apparatus energizes and de-energizes a starter according to a command from an outside. A series circuit to which semiconductor switches are connected in series is provided between a battery serving as a power supply and the starter. The starter is energized by bringing all the semiconductor switches into conduction. A voltage or a current at a predetermined point in the series circuit is monitored to make a self-diagnosis on whether the starter is allowed to start and whether there is a failure in the semiconductor switches according to a monitor output. The starter driving semiconductor switch apparatus is thus expected to have a longer useful life by energizing the starter not by using mechanical contacts but by using semiconductor switches.

13 Claims, 6 Drawing Sheets

STARTER DRIVING SEMICONDUCTOR SWITCH APPARATUS

BACKGROUND OF THE INVENTION

1. Field of the Invention

The present invention relates to a semiconductor switch apparatus used to drive a vehicle starter.

2. Background Art

An electromagnetic switch having mechanical contacts has been used to drive a vehicle starter. As is shown, for example, in JP-A-2009-224315, a main switch to drive a starter is formed of a solenoid incorporating a switch coil and a plunger and configured to operate as follows. That is, as the switch coil is energized, an electromagnet is formed for the switch coil to attract the plunger and a main contact is closed in association with motion of the plunger. When energization of the switch coil is stopped and the attraction force vanishes, the plunger is pushed back by a reaction force of a spring and the main contact is opened.

In order to meet the demand for low fuel-consumption and low emission in recent years, an idling stop and start system that automatically stops the engine when the vehicle stops running and restarts the engine when the vehicle starts running again is put into practical use. In the idling stop and start system, because the engine is started each time the vehicle stops and starts running again, the engine is started far more frequently than in an engine control system in the related art.

The electromagnetic switch having mechanical contacts in the related art therefore has a problem that durability is not satisfactory. Also, in the event of failure, such as contact fixation, the electromagnetic switch having mechanical contacts is locked at the closing position, which raises a problem that energization of the starter cannot be stopped. Conversely, in the event of failure, such as disconnection of the electromagnetic coil, the electromagnetic switch having mechanical contacts is locked at the opening position, which raises a problem that the engine cannot be restarted.

SUMMARY OF THE INVENTION

The invention was devised to solve the problems discussed above and has an object to provide a starter driving semiconductor switch apparatus expected to have a longer useful life by energizing a starter not by using mechanical contacts but by using semiconductor switches.

A starter driving semiconductor switch apparatus according to an aspect of the invention energizes and de-energizes a starter according to commands from an outside and includes a series circuit provided between a battery serving as a power supply and the starter, to which a plurality of semiconductor switches are connected in series. The starter is energized by bringing all the semiconductor switches into conduction. One of a voltage and a current at a predetermined point in the series circuit is monitored to make a self-diagnosis on whether the starter is allowed to start and whether there is a failure in the semiconductor switches according to a monitor output.

The starter driving semiconductor switch apparatus of the invention configured as above includes the series circuit to which a plurality of semiconductor switches are connected in series and energizes the starter not by using mechanical contacts but by bringing all the plurality of semiconductor switches into conduction. A longer useful life can be thus expected. Also, because a voltage or a current at a predetermined point in the series circuit is monitored to make a self-diagnosis on whether the starter is allowed to start and whether there is a failure in the semiconductor switches according to a monitor output. It thus becomes possible to prevent an inconvenience that the engine is stopped even when energization of the starter cannot be stopped or the starter is not allowed to restart because of a failure.

The foregoing and other object, features, aspects, and advantages of the present invention will become more apparent from the following detailed description of the present invention when taken in conjunction with the accompanying drawings.

DESCRIPTION OF THE PREFERRED EMBODIMENTS

Hereinafter, embodiments of the invention will be described on the basis of the drawings.

First Embodiment

Figure 1:
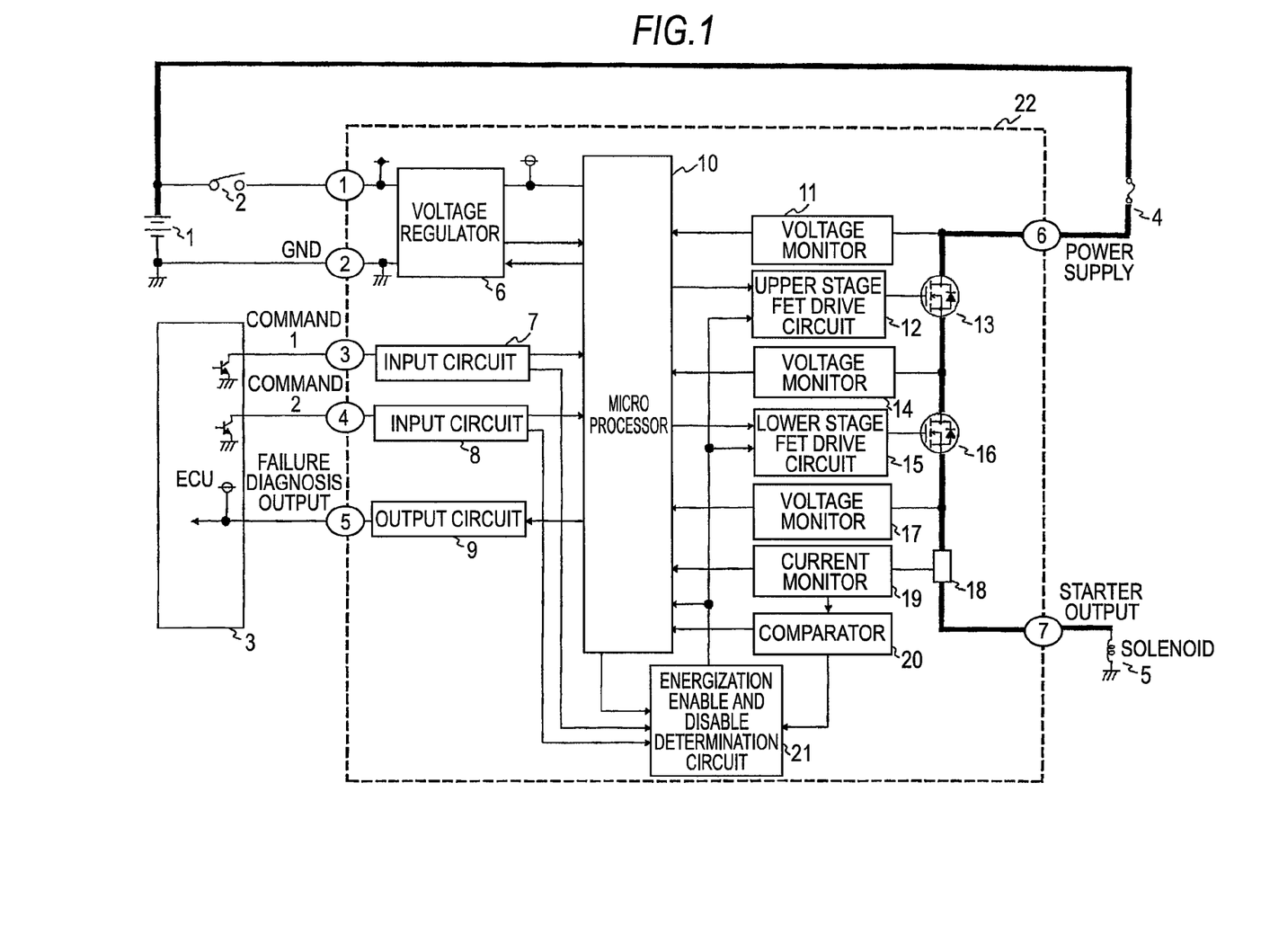
FIG. 1 is a functional block diagram of a starter driving semiconductor switch apparatus and peripheral devices according to a first embodiment of the invention.

FIG. 1 is a functional block diagram of a starter driving semiconductor switch apparatus and peripheral devices according to a first embodiment.

A battery 1 serving as a power supply is connected to a first terminal of a starter driving semiconductor switch apparatus 22 via a main relay 2. To the first terminal, a voltage regulator 6 is connected and a circuit power supply voltage generated in the voltage regulator 6 is supplied to a micro processor 10 and other electronic circuits inside the starter driving semiconductor switch apparatus 22. The battery 1 is also connected to a sixth terminal of the starter driving semiconductor switch apparatus 22 via a fuse 4. The sixth terminal is connected to a seventh terminal via an upper stage FET 13 serving as an upper stage semiconductor switch, a lower stage FET 16 serving as a lower stage semiconductor switch, and a current detection resistor 18. The seventh terminal is connected to a solenoid 5 inside a starter. A second terminal is connected to a GND (earth terminal).

An ECU (Engine Control Unit) 3 installed outside the starter driving semiconductor switch apparatus 22 outputs starter driving command 1 and command 2 to the starter driving semiconductor switch apparatus 22. Herein, two signals are outputted. The commands, however, are not limited to two signals and it is sufficient to output at least two signals. Alternatively, the commands may be transmitted through communications, such as CAN.

The command 1 is connected to a third terminal of the starter driving semiconductor switch apparatus 22 and inputted into the micro processor 10 via an input circuit 7 and it is also inputted into an energization enable and disable determination circuit 21. The command 2 is connected to a fourth terminal of the starter driving semiconductor switch apparatus 22 and inputted into the micro processor 10 via an input circuit 8 and it is also inputted into the energization enable and disable determination circuit 21. The micro processor 10 outputs a failure diagnosis output 5 to the ECU 3 via an output circuit 9 and a fifth terminal.

A voltage monitor 11 is an electronic circuit that transmits a voltage between the sixth terminal and the upper stage FET 13 to an A-to-D port of the micro processor 10.

A voltage monitor 14 is an electronic circuit that transmits a voltage between the upper stage FET 13 and the lower stage FET 16 to the A-to-D port of the micro processor 10.

A voltage monitor 17 is an electronic circuit that transmits a voltage between the lower stage FET 16 and the current detection resistor 18 to the A-to-D port of the micro processor 10.

A current monitor 19 is an electronic circuit that amplifies a voltage drop occurring in the current detection resistor 18 and transmits the resulting amplified signal to the A-to-D port of the microprocessor 10 and a comparator 20.

The comparator 20 compares the amplified signal transmitted from the current monitor 19 with a predetermined level and transmits a comparison result to the micro processor 10 and the energization enable and disable determination circuit 21.

The energization enable and disable determination circuit 21 outputs an energization enable and disable signal to an upper stage FET drive circuit 12 and a lower stage FET drive circuit 15 according to signals from the input circuit 7, the input circuit 8, the micro processor 10, and the comparator 20.

The upper stage FET drive circuit 12 brings the upper stage FET 13 into or out of conduction according to an output signal from the micro processor 10 and an output signal from the energization enable and disable determination circuit 21.

The lower stage FET drive circuit 15 brings the lower stage FET 16 into or out of conduction according to an output signal from the micro processor 10 and an output signal from the energization enable and disable determination circuit 21.

Operation of the respective portions will now be described in detail.

An energization operation of the starter, which is the basic function of the starter driving semiconductor switch apparatus 22, will be described first.

The command 1 and the command 2 are low-active digital signals. When the both signals become low, the micro processor 10 outputs a low signal to the upper stage FET drive circuit 12 and the lower stage FET drive circuit 15 (low active). In the meantime, the command 1 and the command 2 are also inputted into the energization enable and disable determination circuit 21. When a state satisfying either Condition 1 or 2 specified below is established, the energization enable and disable determination circuit 21 outputs a low signal to the upper stage FET drive circuit 12 and the lower stage FET drive circuit 15 (low active).

Condition 1: all three following conditions are satisfied,
  (i) a signal from the input circuit 7 of the command 1 is low (low active),
  (ii) a signal from the input circuit 8 of the command 2 is low (low active), and
  (iii) a signal from the comparator 20 is low (voltage drop amplified value≤predetermined value) without an eddy current.

Condition 2: both two following conditions are satisfied,
  (iv) it is within 5 ms from a falling edge of a signal from the micro processor 10, and
  (v) a signal from the comparator 20 is low (voltage drop amplified value≤predetermined value) without an eddy current.

In a case where a signal from the micro processor 10 is low and a signal from the energization enable and disable determination circuit 21 is also low, the upper stage FET drive circuit 12 and the lower stage FET drive circuit 15 bring the upper stage FET 13 and the lower stage FET 16, respectively, into conduction.

Consequently, a current flows in a path: battery 1⇒ fuse 4⇒ sixth terminal of starter driving semiconductor switch apparatus 22⇒ upper stage FET 13⇒ lower stage FET 16⇒ current detection resistor 18⇒ seventh terminal of starter driving semiconductor switch apparatus 22⇒ solenoid 5 inside starter. As the solenoid 5 inside the starter is energized, an unillustrated plunger inside the starter jumps out and a starter output gear fits into a ring gear on the engine side. Also, a switch inside the starter is closed and energization of a starter motor is started. A rotation force is thus generated and the engine is started.

In this instance, a current value flown into the solenoid 5 inside the starter is monitored by the micro processor 10 via the current detection resistor 18 and the current monitor 19. Hence, should an eddy current flow due to a GND short (earth fault) of a wire between the seventh terminal and the solenoid 5 inside the starter, energization can be stopped.

Also, because it is configured in such a manner that an output of the current monitor 19 is compared with a predetermined value in the comparator 20 and a comparison result is inputted into the energization enable and disable determination circuit 21, energization can be stopped in this path, too.

In FIG. 1, the voltage monitor 17 is connected between the lower stage FET 16 and the current detection resistor 18. However, the voltage monitor 17 may be connected between the current detection resistor 18 and the seventh terminal. In this case, energization can be stopped by determining a GND short when the monitor value of the voltage monitor 17 is close to 0 V.

In this embodiment, two FETs are provided and it is sufficient to provide at least two FETs.

Failure diagnosis operations will now be described.

A diagnosis on an electric power supply to the sixth terminal will be described first.

The micro processor 10 monitors a voltage at the sixth terminal of the starter driving semiconductor switch apparatus 22 via the voltage monitor 11. Because the sixth terminal of the starter driving semiconductor switch apparatus 22 is connected to the battery 1 via the fuse 4, a battery voltage is constantly applied to the sixth terminal in the absence of trouble in this path.

In a case where the battery voltage is not applied to the sixth terminal, wire disconnection or fusing of the fuse 4 is thought to be the cause, and in this case, the battery voltage is not detected by the voltage monitor 11. Because the voltage monitor 11 includes at least a resistor divider and the A-to-D port of the micro processor 10 is in a pull-down state, the micro processor 10 detects 0 V as the result of A-to-D conversion. Hence, the starter is not allowed to be driven because there is a trouble in the path between the sixth terminal of the starter driving semiconductor switch apparatus 22 and the battery 1. The micro processor 10 therefore outputs a diagnosis result indicating that that starter is not allowed to start to the ECU 3 via the output circuit 9 and the fifth terminal.

As an output signal, a digital output in a high or low level is used and a high-level signal is outputted when the starter is not allowed to start. In response to this output, the ECU 3 performs processing, such as inhibiting an idle stop or lighting an unillustrated waning lamp, because the starter is not allowed to restart.

In a case where no failure is detected in the starter driving semiconductor switching apparatus 22, the micro processor 10 outputs a low-level signal to the ECU 3 via the output circuit 9 and the fifth terminal.

A failure diagnosis operation for the upper stage FET 13 will now be described.

A diagnosis as follows is made in a period during which the starter energization commands are not outputted from the ECU 3.

A short failure diagnosis on the upper stage FET 13 is performed as the micro processor 10 monitors a voltage at the connecting point of the upper stage FET 13 and the lower stage FET 16 via the voltage monitor 14.

To be more concrete, in a case where a voltage equal to the battery voltage is detected as the result of A-to-D conversion by the micro processor 10 via the voltage monitor 14 while both the upper stage FET 13 and the lower stage FET 16 are turned OFF, it is determined that the upper stage FET 13 has a short failure.

In this case, the starter driving semiconductor switch apparatus 22 is deemed as having a failure and the micro processor 10 outputs a diagnosis result indicating a semiconductor switch apparatus failure to the ECU 3 via the output circuit 9 and the fifth terminal.

As an output signal, a pulse having a high-to-low duty of 50% is outputted when there is a semiconductor switch apparatus failure. In response to this output, the ECU 3 performs processing, such as lighting an unillustrated warning lamp, because the starter driving semiconductor switch apparatus 22 has a failure.

Regarding an open failure diagnosis on the upper stage FET 13, in a case where a voltage equal to the battery voltage is not detected as the result of A-to-D conversion by the micro processor 10 via the voltage monitor 14 by turning ON the upper stage FET 13 alone while the lower stage FET 16 is turned OFF, it is determined that the upper stage FET 13 has an open failure.

In a case where the upper stage FET 13 has an open failure, because the voltage monitor 14 includes at least a resistor divider and the A-to-D port of the micro processor 10 is in a pull-down state, the micro processor 10 detects 0 V as the result of A-to-D conversion. In this case, the starter driving semiconductor switch apparatus 22 is deemed as having a failure and the micro processor 10 outputs a diagnosis result indicating that the starter is not allowed to start to the ECU 3 via the output circuit 9 and the fifth terminal.

As an output signal, a digital output in a high or low level is used and a high-level signal is outputted when the starter is not allowed to start. In response to this output, the ECU 3 performs processing, such as inhibiting an idle stop and lighting an unillustrated warning lamp, because the starter is not allowed to restart.

A failure diagnosis operation for the lower stage FET 16 will now be described. The failure diagnosis operation for the lower stage FET 16 will be described with reference to the timing chart of FIG. 2.

Figure 2:
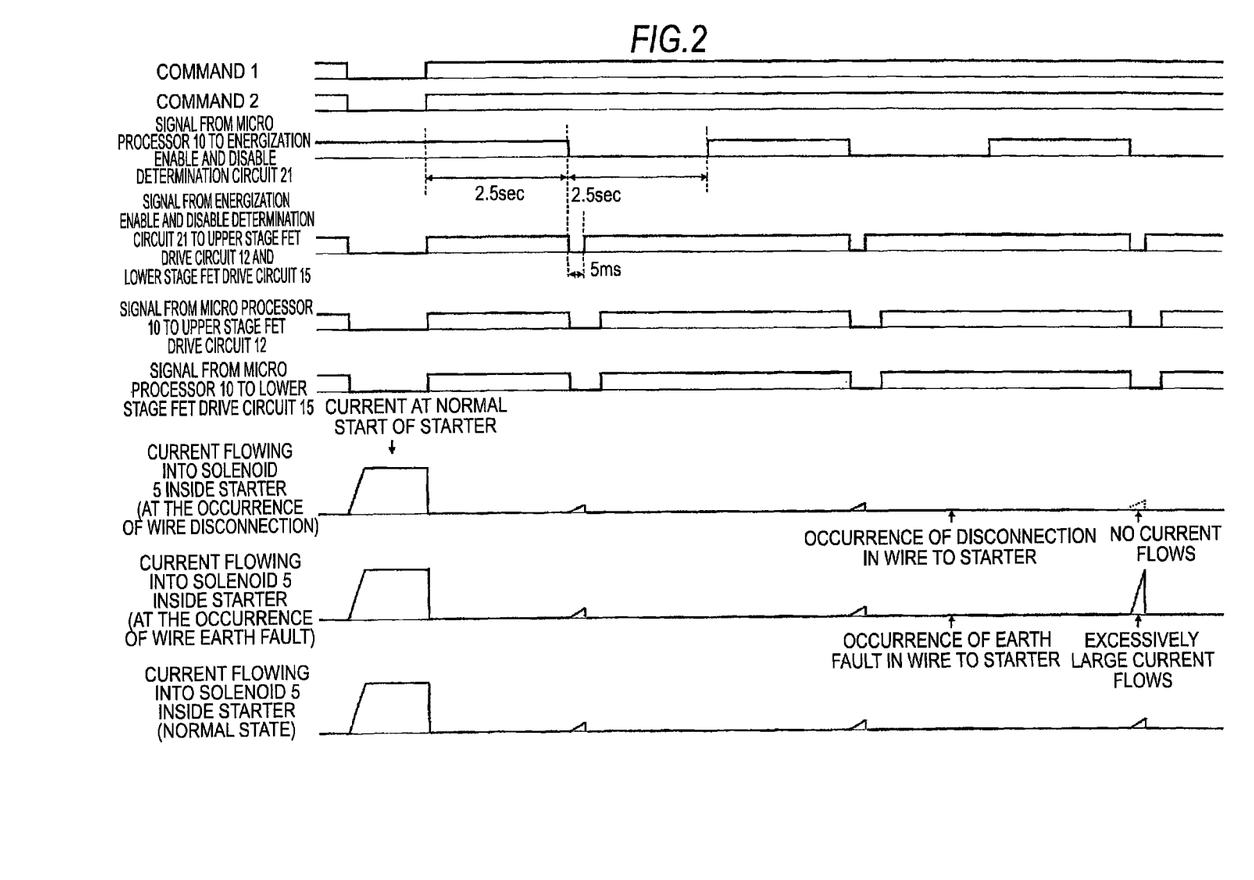
FIG. 2 is a timing chart used to describe a diagnosis by short-time energization of the starter driving semiconductor switch apparatus according to the first embodiment.

A diagnosis as follows is made in a period during which the starter energization commands are not outputted from the ECU 3.

A failure diagnosis on the lower stage FET 16 is made by turning ON both the upper stage FET 13 and the lower stage FET 16 at the same time for too short a time for the starter not to operate. To be more concrete, an energization time has to be limited to about 10 ms at maximum.

The upper stage FET 13 and the lower stage FET 16 are turned ON by outputs from the upper stage FET drive circuit 12 and the lower stage FET drive circuit 15, respectively. Herein, the conditions to turn on the respective FETs 13 and 16 are that an output signal from the micro processor 10 and an output signal from the energization enable and disable determination circuit 21 have been inputted into the upper stage FET drive circuit 12 and the lower stage FET drive circuit 15, and that the both output signals are active (in a low level).

In order to make a failure diagnosis on the lower stage FET 16, Condition 2 for low level output for the energization enable and disable determination circuit 21 specified above is satisfied. Of Condition 2, "it is within 5 ms from a falling edge of a signal from the micro processor 10" is set to prevent the upper stage FET 13 and the lower stage FET 16 from being turned ON continuously due to an output port failure of the micro processor 10. Accordingly, the energization enable and disable determination circuit 21 includes a differentiation circuit therein.

Condition 2: both two following conditions are satisfied, (iv) it is within 5 ms from a falling edge of a signal from the micro processor 10, and (v) a signal from the comparator 20 is low (voltage drop amplified value≤predetermined value) without an eddy current.

Hence, on the premise that no eddy current is detected, the micro processor 10 changes an output to the energization enable and disable determination circuit 21 from high to low. As the micro processor 10 further changes an output to the upper stage FET drive circuit 12 and the lower stage FET drive circuit 15 from high to low, it becomes possible to turn ON the upper stage FET 13 and the lower stage FET 16 for a short time even when the command 1 and the command 2 from the ECU 3 are not active (low level).

The above will be described using the timing chart of FIG. 2. When both the command 1 and the command 2 shift to a high level after the end of a normal engine start operation on the leftmost of the timing chart, a signal to the energization enable and disable determination circuit 21 from the micro processor 10 changes from high to low once in every five seconds. This signal is converted into a signal that stays low for 5 ms from the falling edge by a one-shot pulse generation circuit using the differentiation circuit. The converted signal is inputted into the upper stage FET drive circuit 12 and the lower stage FET drive circuit 15. In synchronization with this timing, the micro processor 10 outputs a signal that stays low for a short time slightly longer than 5 ms to the upper stage FET drive circuit 12 and the lower stage FET drive circuit 15.

A determination as follows is made as the result of turning ON the upper stage FET 13 and the lower stage FET 16 for a short time. On the basis of the result of A-to-D conversion of a voltage signal inputted into the micro processor 10 via the current detection resistor 18 and the current monitor 19, it is determined as follows.

(a) In a case where absolutely no current is detected (a current waveform at the occurrence of wire disconnection of FIG. 2), it is determined that the lower stage FET 16 has an open failure or the connection from the lower stage FET 16 to the solenoid 5 inside the starter is opened (on the premise that it is determined in the manner as described above that the upper stage FET 13 has no failure);

(b) in a case where an excessively large current for a state where the solenoid 5 inside the starter is connected normally is detected (a current waveform at the occurrence of wire earth fault of FIG. 2), it is determined that there is an earth fault in the starter driving semiconductor switch apparatus 22 or in the wire to the solenoid 5 inside the starter; and (c) in a case where a small current is detected while the solenoid 5 inside the starter is normally connected (a current waveform in a normal state of FIG. 2), it is determined that the lower stage FET 16 does not have an open failure at least and there is no earth fault is the starter driving semiconductor switch apparatus 22 or in the wire to the solenoid 5 inside the starter.

Determination current values in (b) and (c) are set depending on how high the current rises by short-time energization when the solenoid 5 inside the starter is normally connected by taking the upper and lower limits including temperature characteristics of impedance and inductance of the solenoid 5 inside the starter into account.

On the basis of the diagnosis result, in the case of (a), the starter is not allowed to restart because the lower stage FET 16 has an open failure or the connection from the lower stage FET 16 to the solenoid 5 inside the starter is opened. Hence, the starter driving semiconductor switch apparatus 22 is deemed as having a failure and the micro processor 10 outputs a diagnosis result indicating that the starter is not allowed to start to the ECU 3 via the output circuit 9 and the fifth terminal.

As an output signal, a digital output in a high or low level is used and a high-level signal is outputted when the starter is not allowed to start. In response to this output, the ECU 3 performs processing, such as inhibiting an idle stop and lighting an unillustrated warning lamp, because the starter is not allowed to restart.

In the case of (b), the starter is not allowed to restart, because there is an earth fault in the starter driving semiconductor switch apparatus 22 or in the wire to the solenoid 5 inside the starter. Hence, the same processing as in the case of (a) above is performed.

In the case of (c), it is determined that the state is normal. Hence, the micro processor 10 outputs a low-level signal to the ECU 3 via the output circuit 9 and the fifth terminal.

A short failure diagnosis on the lower stage FET 16 can be made by an operation same as the operation for the open failure diagnosis on the upper stage FET 13 described above. In a case where a voltage equal to the battery voltage is detected as the result of A-to-D conversion by the micro processor 10 via the voltage monitor 17 by turning ON the upper stage FET 13 alone while the lower stage FET 16 is turned OFF, it is determined that the lower stage FET 16 has a short failure.

In a case where the lower stage FET 16 does not have a short failure, because the voltage monitor 17 includes at least a resistor divider and the A-to-D port of the micro processor 10 is in a pull-down state, the micro processor 10 detects 0 V as the result of A-to-D conversion.

In this diagnosis operation, the upper stage FET 13 alone is turned ON for a short time in the same manner as described above. In other words, in response to the falling of a signal from the micro processor 10, the energization enable and disable determination circuit 21 outputs a short-time enable signal (low level) to the upper stage FET drive circuit 12 and the lower stage FET drive circuit 15 whereas the micro processor 10 outputs an enable signal (low level) to the upper stage FET drive circuit 12 and a disable signal (high level) to the lower stage FET drive circuit 15.

In a case where a short failure of the lower stage FET 16 is detected, the starter driving semiconductor switch apparatus 22 is deemed as having a failure. The micro processor therefore outputs a diagnosis result indicating a semiconductor switch apparatus failure to the ECU 3 via the output circuit 9 and the fifth terminal.

As an output signal, a pulse having a high-to-low duty of 50% is outputted where there is a semiconductor switch apparatus failure. In response to this output, the ECU 3 performs processing, such as lighting an unillustrated warning lamp, because there is a semiconductor switch apparatus failure.

When a test by short-time energization as described above is performed often, a current is consumed wastefully and the respective FETs operate more frequently. Accordingly, it is preferable to configure in such a manner that a diagnosis request signal from the ECU 3 is added and the starter driving semiconductor switch apparatus 22 performs a diagnosis operation upon receipt of the diagnosis request signal. It is also preferable to configure in such a manner that a diagnosis request is outputted to the starter driving semiconductor switch apparatus 22 before the ECU 3 executes an idle stop, so that an idle stop is executed after it is confirmed that a diagnosis result indicating a failure (the starter is not allowed to restart) has not been returned.

The micro processor 10 monitors a downstream voltage of the lower stage FET 16 by A-to-D conversion via the voltage monitor 17 in a period during which the short-time energization described above is not performed and the micro processor 10 is not outputting a driving enable signal (low level) to the upper stage FET drive circuit 12 and the lower stage FET drive circuit 15.

The condition described above means that both the upper stage FET 13 and the lower stage FET 16 are turned OFF. In a case where the battery voltage is detected by the voltage monitor 17 in this state, it is determined that both the upper stage FET 13 and the lower stage FET 16 have a short failure.

The starter driving semiconductor switch apparatus 22 is therefore deemed as having a failure and the micro processor 10 outputs a diagnosis result indicating a semiconductor switch apparatus failure to the ECU 3 via the output circuit 9 and the fifth terminal.

As an output signal, a pulse having a high-to-low duty of 50% is outputted when there is a semiconductor switch apparatus failure. In response to this output, the ECU 3 performs processing, such as lighting an unillustrated warning lamp, because there is a semiconductor switch apparatus failure.

In this embodiment, the voltage monitors are provided at three points. However, because a diagnosis on a supply voltage from the battery 1 can be made by the voltage monitor 14 by turning ON the upper stage FET 13, the voltage monitor 11 may be omitted by regularly performing short-time energization on the upper stage FET 13 alone also in a period during which both the command 1 and the command 2 are in a disable state (high level).

An earth fault from the lower stage FET 16 to the solenoid 5 inside the starter may be detected by determining, via the voltage monitor 17, the absence or presence of a surge voltage occurring when energization of the solenoid 5 inside the start is stopped.

In this embodiment, it is configured in such a manner that a current flows in a path: battery 1⇒ starter driving semiconductor switch apparatus 22 (two FETs)⇒ solenoid 5 inside starter⇒ GND. Alternatively, it may be configured in such a manner that a current flows in a path: battery 1⇒ solenoid 5 inside starter⇒ starter driving semiconductor switch apparatus 22 (two FETs)⇒ GND. In this case, the absence or presence of all failures can be detected using a current.

Likewise, it may be configured in such a manner that a current flows in a path: battery 1⇒ starter driving semiconductor switch apparatus 22 (one FET)⇒ solenoid 5 inside starter⇒ starter driving semiconductor switch apparatus 22 (the other FET)⇒ GND.

In this case, a failure diagnosis on the upstream FET is made by the voltage monitor and a failure diagnosis on the downstream FET is made by the current monitor.

Second Embodiment

Figure 3:
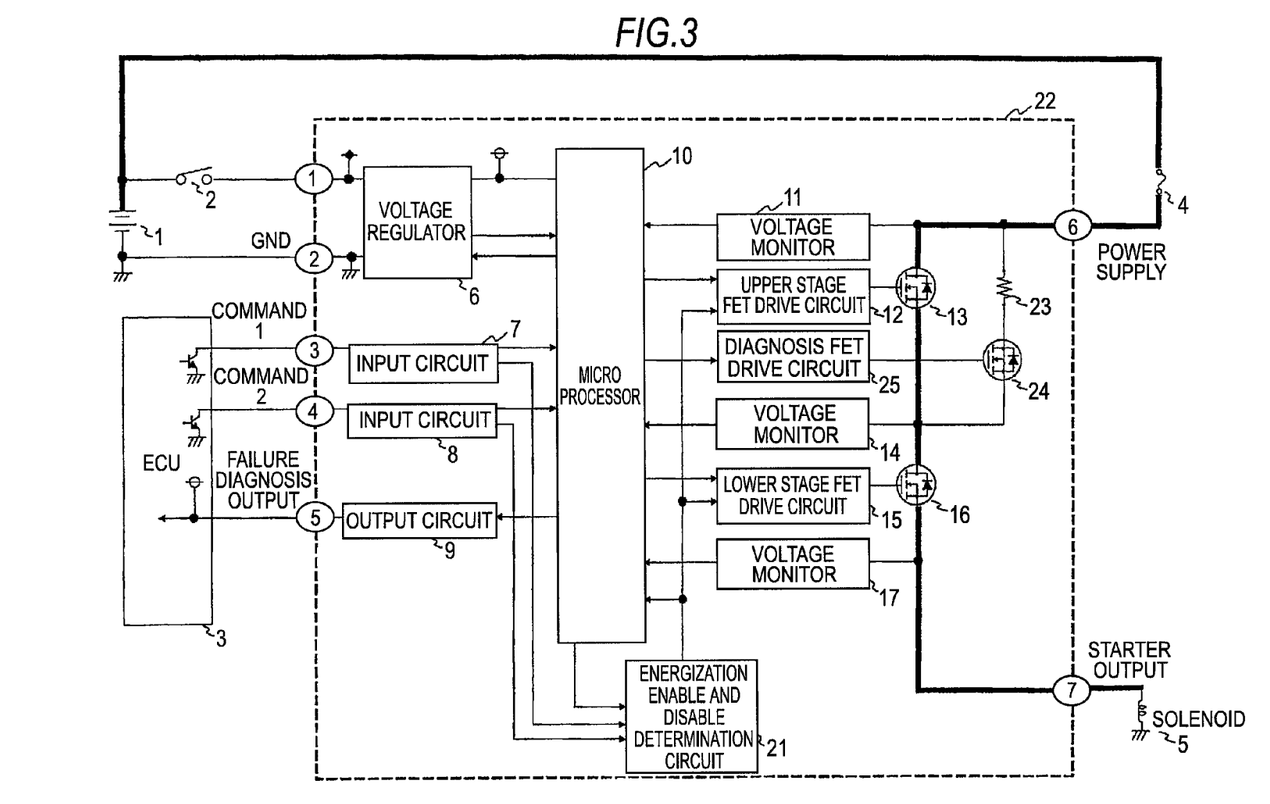
FIG. 3 is a functional block diagram of a starter driving semiconductor switch apparatus and peripheral devices according to a second embodiment of the invention.

FIG. 3 is a functional block diagram of a starter driving semiconductor switch apparatus and peripheral devices according to a second embodiment.

The second embodiment is different from the first embodiment above (FIG. 1) in that the current detection function is omitted, that is, the current detection resistor 18, the current monitor circuit 19, and the comparator 20 are omitted, and that a diagnosis FET 24, a diagnosis FET drive circuit 25, and a current-limiting resistor 23 in a path of the diagnosis FET 24 are additionally provided.

Because the current detection function is omitted as the first changed point, the energization enable conditions of the energization enable and disable determination circuit 21 are as follows.

Condition 1: both two following conditions are satisfied, (i) a signal from the input circuit 7 of the command 1 is low (low active), and (ii) a signal from the input circuit 8 of the command 2 is low (low active).

Condition 2: the following condition is satisfied, it is within 5 ms from a falling edge of a signal from the micro processor 10.

Regarding an energization operation of the starter, which is the basic function of the starter driving semiconductor switch apparatus 22, it is the same as the energization operation in the first embodiment above except that the current detection function is omitted.

Diagnosis operations of the second embodiment will now be described.

A diagnosis on an electric power supply to the sixth terminal is the same as the diagnosis in the first embodiment above.

Short and open failure diagnosis operations for the upper stage FET 13 are also the same as the diagnosis operations in the first embodiment above.

A diagnosis operation for a short failure in both the upper stage FET 13 and the lower stage FET 16 is also the same as the diagnosis operation in the first embodiment above. A diagnosis operation of a short failure in the lower stage FET 16 is also the same as the diagnosis operation in the first embodiment above.

Diagnosis methods for failures specified below are different from the methods in the first embodiment above:

an open failure in the lower stage FET 16;

an open failure in the path from the lower stage FET 16 to the starter; and an earth fault in the path from the lower stage FET 16 to the starter.

As operations for the diagnosis, the diagnosis FET 24 and the lower stage FET 16 are turned ON simultaneously for a short time. The diagnosis FET 24 is turned ON by the micro processor 10 via the diagnosis FET drive circuit 25. It is preferable that the diagnosis FET drive circuit 25 includes a differentiation circuit, so that the diagnosis FET 24 is turned ON for a predetermined time since a rising or falling of an output signal from the output port of the micro processor 10. A method of turning ON the lower stage FET 16 is the same as the method described in the first embodiment above. It should be noted, however, that the micro processor 10 outputs an enable signal (low level) to the lower stage FET drive circuit 15 alone and outputs a disable signal (high level) to the upper stage FET drive circuit 12.

When the diagnosis FET 24 and the lower stage FET 16 are turned ON simultaneously for a short time, in a case where it is found from the result that there is no abnormality in a path: battery 1⇒ sixth terminal of starter driving semiconductor switch apparatus 22⇒ current-limiting resistor 23⇒ diagnosis FET 24⇒ lower stage FET 16⇒ seventh terminal of starter driving semiconductor switch apparatus 22⇒ solenoid 5 inside starter⇒ GND, a voltage obtained by dividing the battery voltage chiefly by the resistance value of the current-limiting resistor 23 and the resistance value of the solenoid 5 inside the starter is detected by the micro processor 10 via the voltage monitor 17. In this case, it can be determined that the lower stage FET 16 does not have an open failure and there is no abnormality in the path from the lower stage FET 16 to the solenoid 5 inside the starter.

When the diagnosis FET 24 and the lower stage FET 16 are turned ON simultaneously for a short time, in a case where it is found from the result that a voltage detected by the micro processor 10 via the voltage monitor 17 is the battery voltage (equal to the voltage monitor 11), it is determined that there is an open failure in the path from the lower stage FET 16 to the solenoid 5 inside the starter.

It should be noted, however, that the precondition to determine "a voltage equal to the voltage monitor 11" is that a pull-down resistance value in the voltage monitor 17 is sufficiently larger than the resistance value of the current-limiting resistor 23.

When the diagnosis FET 24 and the lower stage FET 16 are turned ON simultaneously for a short time, in a case where it is found from the result that the voltage detected by the micro processor 10 via the voltage monitor 17 is 0 V, it is determined that the lower stage FET 16 has an open failure or there is an earth fault in the path from the lower stage FET 16 to the starter.

In a case where it is determined that there is any one of an open failure in the path from the lower stage FET 16 to the starter, an open failure in the lower stage FET 16, and an earth fault in the path from the lower stage FET 16 to the starter, because the starter is not allowed to restart, the starter driving semiconductor switch apparatus 22 is deemed as having a failure. The micro processor 10 therefore outputs a diagnosis result indicating that the starter is not allowed to start to the ECU 3 via the output circuit 9 and the fifth terminal. As an output signal, a digital output in a high or low level is used and a high-level signal is outputted when the starter is not allowed to start. In response to this output, the ECU 3 performs processing, such as inhibiting an idle stop and lighting an unillustrated warning lamp, because the starter is not allowed to restart.

Figure 4:
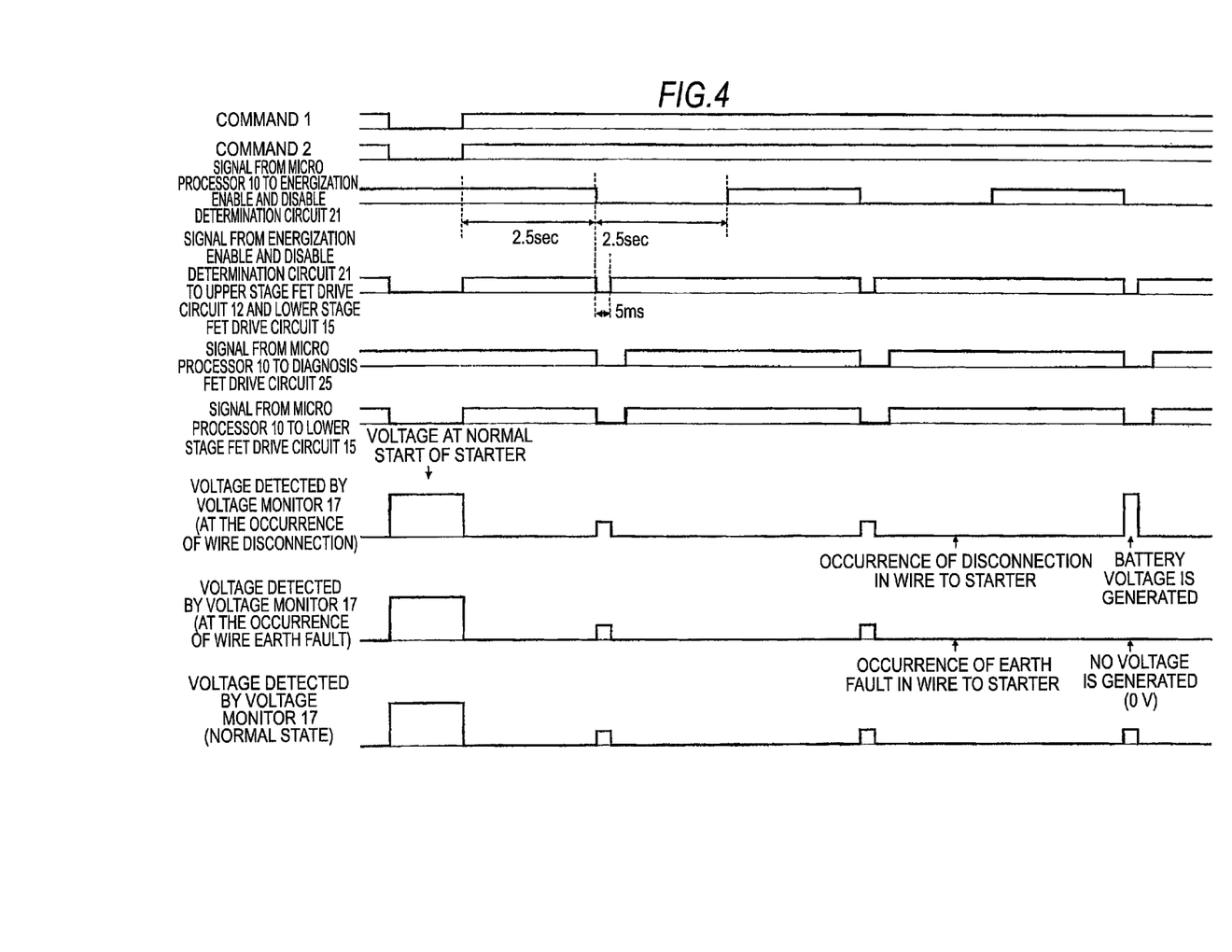
FIG. 4 is a timing chart used to describe a diagnosis by short-time energization of the starter driving semiconductor switch apparatus according to the second embodiment.

FIG. 4 shows a timing chart of a failure diagnosis through a short-time energization operation by the diagnosis FET 24 and the lower stage FET 16 of this embodiment. When both the command 1 and the command 2 shift to a high level after the end of a normal engine start operation at the leftmost in the timing chart, a signal from the micro processor 10 to the energization enable and disable determination circuit 21 changes from high to low once in every five seconds. This signal is converted to a signal that stays low for 5 ms from a falling edge by a one-shot pulse generation circuit using the differentiation circuit and the converted signal is inputted into the upper stage FET drive circuit 12 and the lower stage FET drive circuit 15. In synchronization with this timing, the micro processor 10 outputs a signal that stays low for a short time slightly longer than 5 ms to the lower stage FET drive circuit 15 and the diagnosis FET drive circuit 25.

In a case where there is an open failure in the path from the lower stage FET 16 to the solenoid 5 inside the starter, the battery voltage is detected by the voltage monitor 17 like a waveform at the occurrence of wire disconnection in FIG. 4.

In a case where there is an open failure in the lower stage FET 16 or there is an earth fault in the path from the lower stage FET 16 to the starter, 0 V is detected by the voltage monitor 17 like a waveform at the occurrence of wire earth fault in FIG. 4.

When there is no abnormality, a voltage obtained by dividing the battery voltage chiefly by the resistance value of the current-limiting resistor 23 and the resistance value of the solenoid 5 inside the starter is detected by the voltage monitor 17.

As in the first embodiment above, when a test by short-time energization is performed often, a current is consumed wastefully and the respective FETs operate more frequently in the second embodiment, too. Accordingly, it is preferable to configure in such a manner that a diagnosis request signal from the ECU 3 is added and the starter driving semiconductor switch apparatus 22 performs a diagnosis operation upon receipt of the diagnosis request signal. It is also preferable to configure in such a manner that a diagnosis request is outputted to the starter driving semiconductor switch apparatus 22 before the ECU 3 executes an idle stop, so that an idle stop is executed after it is confirmed that a diagnosis result indicating a failure (the starter is not allowed to restart) has not be returned.

Third Embodiment

Figure 5:
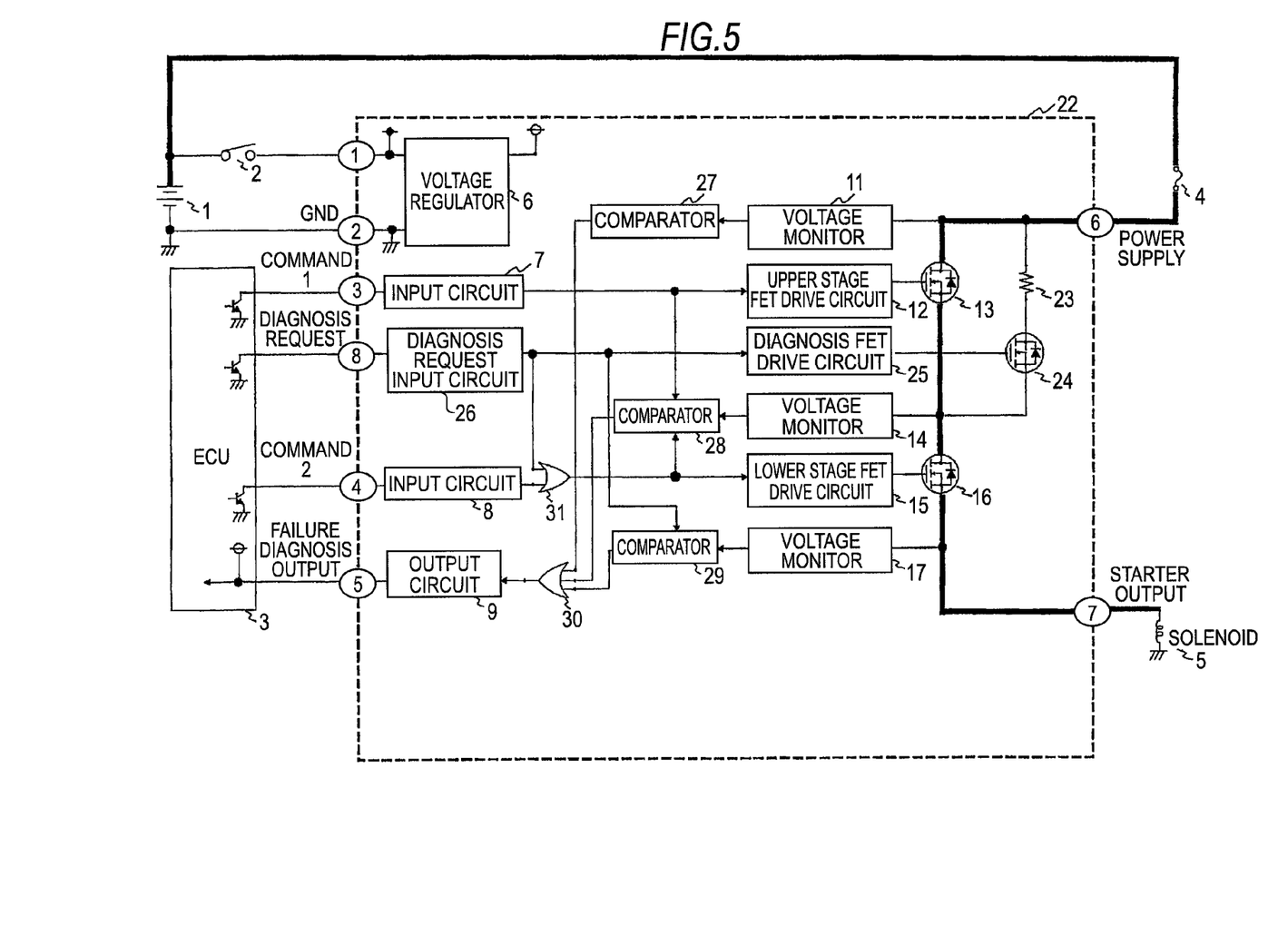
FIG. 5 is a functional block diagram of a starter driving semiconductor switch apparatus and peripheral devices according to a third embodiment of the invention.

FIG. 5 is a functional block diagram of a starter driving semiconductor switch apparatus and peripheral devices according to a third embodiment.

The third embodiment is different from the second embodiment above (FIG. 3) in that the micro processor 10 is eliminated.

Also, a diagnosis request signal is added as a signal from the ECU 3 and the diagnosis request signal is inputted into an eighth terminal of the starter driving semiconductor switch apparatus 22 and inputted into the diagnosis FET drive circuit 25 via a diagnosis request input circuit 26. Also, an OR with the input circuit 8 of the command 2 is found. The OR is connected to the lower stage FET drive circuit 15.

An output of the voltage monitor 11 is inputted into a comparator 27. An output of the voltage monitor 14 is inputted into a comparator 28 and an output of the voltage monitor 17 is inputted into a comparator 29. To the comparator 28, an output of the input circuit 7 of the command 1 and an output of the input circuit 8 of the command 2 are connected. Also, an output of the diagnosis request input circuit 26 is connected to the comparator 29. An OR of the outputs of the comparators 27, 28, and 29 is found and the OR is connected to the output circuit 9.

An operation of the starter driving semiconductor switch apparatus 22 of this embodiment will now be described. As a basic operation, the upper stage FET drive circuit 12 turns ON the upper stage FET 13 when the command 1, which is inputted therein via the input circuit 7 of the command 1, is to enable energization (low level). Also, the lower stage FET drive circuit 15 turns ON the lower stage FET 16 when the command 2, which is inputted therein via the input circuit 8 of the command 2, is to enable energization (low level).

Consequently, a current flows in a path: battery 1⇒ fuse 4⇒ sixth terminal of starter driving semiconductor switch apparatus 22⇒ upper stage FET 13⇒ lower stage FET 16⇒ seventh terminal of starter driving semiconductor switch apparatus 22⇒ solenoid 5 inside starter⇒ GND, and a start operation is performed.

Failure diagnosis operations are performed in the manner as follows.

A diagnosis on an electric power supply to the sixth terminal of the starter driving semiconductor switch apparatus 22 is made by the comparator 27 via the voltage monitor 11. To be more concrete, the voltage monitor 11 includes at least a resistor divider and a filter circuit and the comparator 27 includes therein at least a comparator that compares a detection voltage divided by the voltage monitor circuit 11 with a determination voltage. It is preferable to set the determination voltage to a voltage in the vicinity of the lowest operable voltage of the system. In a case where the detection voltage is equal to or lower than the determination voltage, the comparator 27 outputs a high-level signal. The high-level signal is transmitted to the output circuit 9 via the OR circuit 30 and the output circuit 9 therefore outputs a high-level signal.

A latch circuit is provided inside the output circuit 9. Accordingly, once an output is shifted to a high level indicating a failure, a high-level output is maintained until a circuit power supply voltage supplied to the first terminal of the starter driving semiconductor switch apparatus 22 is stopped. In response to the high-level signal output, the ECU 3 performs processing, such as inhibiting an idle stop and lighting an unillustrated warning lamp, because the starter driving semiconductor switch apparatus 22 has a failure.

A failure diagnosis on the upper stage FET 13 is made in the manner as follows.

At least the voltage monitor 14 includes a resistor divider and a filter circuit and an output of the voltage monitor 14 is inputted into the comparator 28. In a case where Condition 1 or Condition 2 specified below is satisfied, the comparator 28 outputs a high-level signal. In a case where neither Condition 1 nor Condition 2 is satisfied, the comparator 28 outputs a low-level signal.

Condition 1: all the following conditions are satisfied,
(i) an output from the input circuit 7 of the command 1 allows FET driving,
(ii) an output from the input circuit 8 of the command 2 inhibits FET driving, and
(iii) a detection voltage from the voltage monitor 14 is below a predetermined voltage.

Condition 2: all the following conditions are satisfied,
(iv) an output from the input circuit 7 of the command 1 inhibits FET driving,
(v) an output from the input circuit 8 of the command 2 inhibits FET driving, and
(vi) a detection voltage from the voltage monitor 14 is equal to or higher than a predetermined voltage.

In a case where Condition 1 is satisfied, the upper stage FET 13 has an open failure and in a case where Condition 2 is satisfied, the upper stage FET 13 has a short failure. In order to make this diagnosis, it is preferable that the ECU 3 performs an output so that the command 1 and the command 2 are in a relation satisfying Condition 1. However, in a case where it is difficult to output signals satisfying this relation, it is also possible to determine whether Condition 1 is satisfied by furnishing the input circuit 7 of the command 1 with a function of delaying a change from allowance to inhabitation.

When the comparator 28 outputs a high-level signal, this signal is transmitted to the output circuit 9 via the OR circuit 30. The output circuit 9 therefore outputs a high-level signal.

It should be appreciated that a latch circuit is provided inside the failure diagnosis output circuit 9 and once an output is shifted to a high level indicating a failure, a high-level output is maintained until a circuit power supply voltage supplied to the first terminal of the starter driving semiconductor switch apparatus 22 is stopped. In response to this high-level signal output, the ECU 3 performs processing, such as inhibiting an idle stop and lighting a warning lamp, because the starter driving semiconductor switch apparatus 22 has a failure.

A failure diagnosis on the lower stage FET 16 and on the downstream side of the lower stage FET 16 is made in the manner as follows.

For these failure diagnoses, a diagnosis is made by operating the diagnoses FET 24 in the same manner as in the second embodiment above. It is preferable that the ECU 3 generates a falling edge in the diagnosis request signal before an idle stop is executed. Accordingly, the diagnosis request input circuit 26 outputs a signal that enables short-time energization. To this end, the diagnosis request input circuit 26 includes at least a differentiation circuit. The short-time energization enable signal is inputted into the lower stage FET drive circuit 15 via the OR circuit 31 to turn ON the lower stage FET 16. The short-time energization enable signal is also inputted into the diagnosis FET drive circuit 25 to turn ON the diagnosis FET 24.

Consequently, a current flows in a path: battery 1⇒ fuse 4⇒ sixth terminal of starter driving semiconductor switch apparatus 22⇒ current-limiting resistor 23⇒ diagnosis FET 24⇒ lower stage FET 16⇒ seventh terminal of starter driving semiconductor switch apparatus 22⇒ solenoid 5 inside starter⇒ GND. When there is no trouble in this path, as has been described in the second embodiment above, a voltage obtained by dividing the battery voltage chiefly by resistance values of the current-limiting resistor 23 and the solenoid 5 inside the starter is detected by the voltage monitor 17.

At least the voltage monitor 17 includes a resistor divider and a filter circuit and an output of the voltage monitor 17 is inputted into the comparator 29. In a case where Condition 1 or Condition 2 specified below is satisfied, the comparator 29 outputs a high-level signal. In a case where neither Condition 1 nor Condition 2 is satisfied, the comparator 29 outputs a low-level signal.

Condition 1: all the following conditions are satisfied,
(i) an output of the diagnosis request input circuit 26 allows FET driving, and
(ii) a detection voltage from the voltage monitor 17 is below a first predetermined voltage.

Condition 2: all the following conditions are satisfied,
(iii) an output of the diagnosis request input circuit 26 allows FET driving, and
(iv) a detection voltage from the voltage monitor 17 is equal to or higher than a second predetermined voltage.

Condition 1 indicates that the diagnosis FET 24 or the lower stage FET 16 is opened or there is an earth fault in the path from the lower stage FET 16 to the solenoid 5 inside the starter and the detection voltage of the voltage monitor 17 is therefore 0 V. Hence, the first predetermined voltage is set to a voltage sufficiently smaller than the voltage obtained by dividing the battery voltage by the resistance values of the current-limiting resistor 23 and the solenoid 5 inside the starter.

Condition 2 indicates that a connection after the lower stage FET 16 and the voltage monitor 17 is opened and the detection voltage of the voltage monitor 17 is therefore substantially the battery voltage. Hence, the second predetermined voltage is set to a voltage sufficiently larger than the voltage obtained by dividing the battery voltage by the resistance values of the current-limiting resistor 23 and the solenoid 5 inside the starter.

When the comparator 29 outputs a high-level signal, the high-level signal is transmitted to the output circuit 9 via the OR circuit 30. The output circuit 9 therefore outputs a high-level signal.

A latch circuit is provided inside the output circuit 9, so that once an output is shifted to a high level indicating a failure, a high-level output is maintained until a circuit power supply voltage supplied to the first terminal of the starter driving semiconductor switch apparatus 22 is stopped. In response to this high-level signal output, the ECU 3 performs processing, such as inhibiting an idle stop and lighting an unillustrated warning lamp, because the starter driving semiconductor switch apparatus 22 has a failure.

Figure 6:
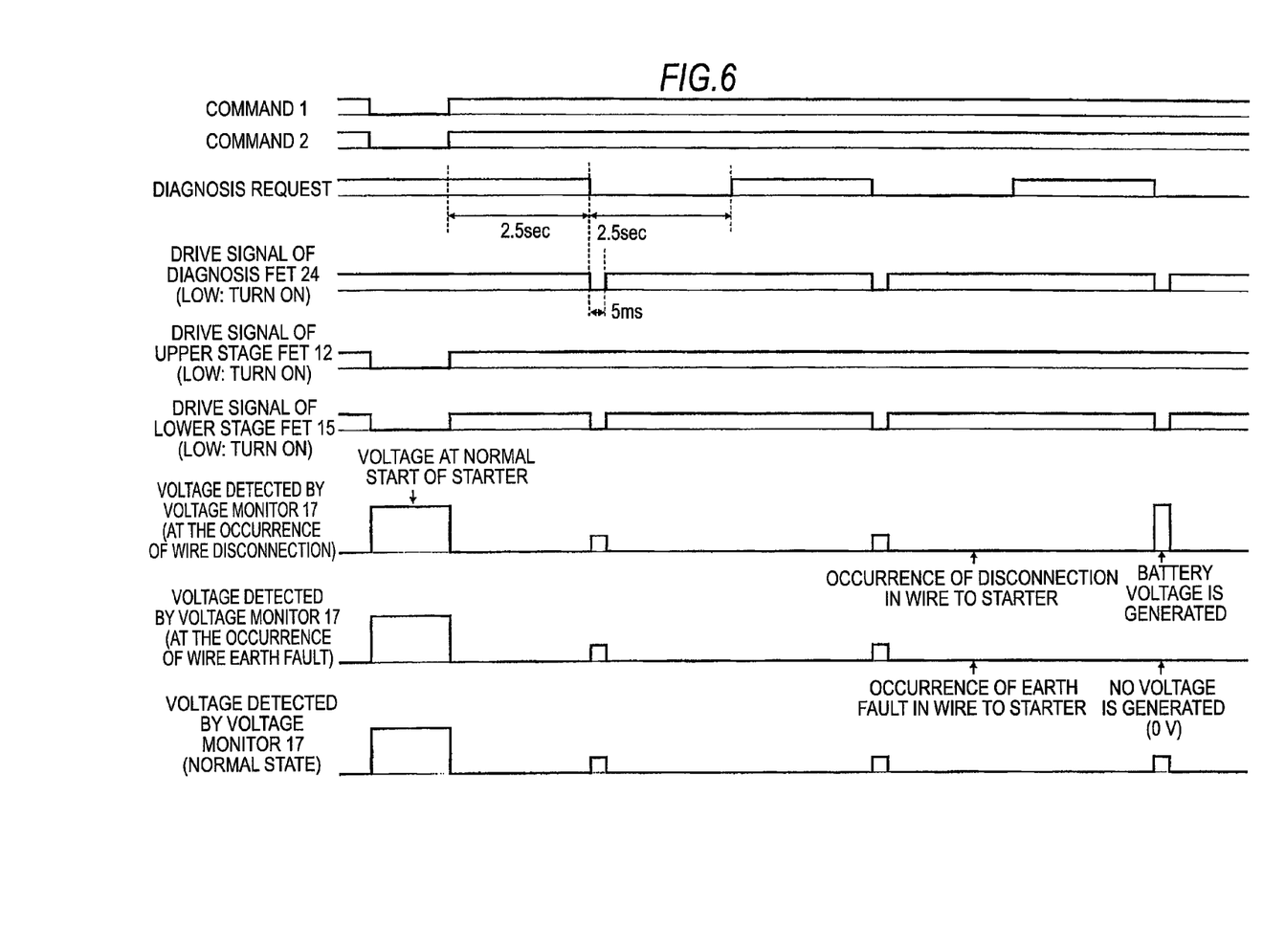
FIG. 6 is a timing chart used to describe a diagnosis by short-time energization of the starter driving semiconductor switch apparatus according to the third embodiment.

FIG. 6 shows a timing chart of a failure diagnosis through the short-time energization operation by the diagnosis FET 24 and the lower stage FET 16 of this embodiment. When both the command 1 and the command 2 shift to a high-level after the end of a normal engine start operation at the leftmost in the timing chart, the diagnosis request signal from the ECU 3 changes from high to low once in every five seconds. This signal is converted to a signal that stays low for 5 ms from a falling edge by a one-shot pulse generation circuit using the differentiation circuit in the diagnosis request input circuit 26. The converted signal is inputted into the diagnosis FET drive circuit 25 and into the lower stage FET drive circuit 15 via the OR circuit 31. Upon input of this signal, the diagnosis FET 24 and the lower stage FET 16 are turned ON simultaneously for a short time.

In a case where there is an open failure in the path from the lower stage FET 16 to the starter, the battery voltage is detected by the voltage monitor 17 like a waveform at the occurrence of wire disconnection of FIG. 6.

In a case where there is an open failure in the lower stage FET 16 or there is an earth fault in the path from the lower stage FET 16 to the starter, 0 V is detected by the voltage monitor 17 like a waveform at the occurrence of wire earth fault of FIG. 6.

When there is no abnormality, a voltage obtained by dividing the battery voltage chiefly by the resistance value of the current-limiting resistor 23 and the resistance value of the solenoid 5 inside the starter is detected by the voltage monitor 17.

Various modifications and alterations of this invention will be apparent to those skilled in the art without departing from the scope and spirit of this invention, and it should be understood that this is not limited to the illustrative embodiments set forth herein.

What is claimed is:

1. A starter driving semiconductor switch apparatus that energizes and de-energizes a starter according to commands from an outside, comprising:
a series circuit provided between a battery serving as a power supply and the starter, to which a plurality of semiconductor switches are connected in series; and
an engine control unit (ECU),
wherein:
all of the plurality of semiconductor switches are brought into conduction for a short time to monitor a current flowing into the semiconductor switches, and in one case where a current equal to or higher than a first predetermined current value is detected and a case where a current below a second predetermined current value is detected, a result of the diagnosis indicating that the starter is not allowed to restart is outputted, the plurality of semiconductor switches are provided outside of the ECU, and a result of the self-diagnosis is output to the ECU.

2. The starter driving semiconductor switch apparatus according to claim 1, wherein:

a battery-side voltage of a semiconductor switch closest to the battery in the plurality of semiconductor switches is monitored and in a case where the voltage being monitored is below a predetermined voltage, the result of the diagnosis indicating that the starter is not allowed to restart, is outputted to the outside.

3. The starter driving semiconductor switch apparatus according to claim 1, wherein:

a starter-side voltage of a semiconductor switch closest to the starter in the plurality of semiconductor switches is monitored and in a case where the voltage being monitored is equal to or higher than a predetermined voltage in a period during which the starter is not energized, the result of the diagnosis indicating a semiconductor switch failure, is outputted to the outside.

4. The starter driving semiconductor switch apparatus according to claim 1, wherein:

a voltage between the plurality of semiconductor switches is monitored and in a case where a semiconductor switch closer to the battery than a monitoring point is in a conducting state but the voltage being monitored is below a predetermined voltage, the result of the diagnosis indicating that the starter is not allowed to restart, is outputted to the outside.

5. The starter driving semiconductor switch apparatus according to claim 1, wherein:

a voltage between the plurality of semiconductor switches is monitored and in a case where a semiconductor switch closer to the battery than a monitoring point is in a non-conducting state but the voltage being monitored is equal to or higher than a predetermined voltage, the result of the diagnosis indicating a semiconductor switch apparatus failure is outputted to the outside.

6. The starter driving semiconductor switch apparatus according to claim 1, wherein:

the self-diagnosis is made using a diagnosis request signal received from a device that determines an execution of an idle stop as a trigger, and the result of the diagnosis indicating one of a state where the starter is not allowed to restart and a normal state is outputted to the device that determines an execution of an idle stop.

7. The starter driving semiconductor switch apparatus according to claim 1, wherein:

start command signals are received from the outside and whether the starter is energized or de-energized is controlled depending whether both a result of recognizing a start command signal by a first energization determination portion and a result of recognizing the start command signal by a second energization determination portion indicate that energization is enabled.

8. The starter driving semiconductor switch apparatus according to claim 7, wherein:

the first energization determination portion performs processing in software by a micro processor and the second energization determination portion performs processing by an electric circuit.

9. The starter driving semiconductor switch apparatus according to claim 8, wherein:

the second energization determination portion forcedly enables energization only for a predetermined short period according to a command from the micro processor and brings the plurality of semiconductor switches into conduction during the short period for the self-diagnosis to be made.

10. A starter driving semiconductor switch apparatus that energizes and de-energizes a starter according to commands from an outside, comprising:

a series circuit provided between a battery serving as a power supply and the starter, to which a plurality of semiconductor switches are connected in series; and a diagnosis semiconductor switch that brings a path between a battery side of a semiconductor switch closest to the battery in the plurality of semiconductor switches and a battery side of a semiconductor switch closest to the starter into and out of conduction, wherein:

the starter is energized by bringing all the semiconductor switches into conduction, one of a voltage and a current at a predetermined point in the series circuit is monitored to make a self-diagnosis on whether the starter is allowed to start and whether there is a failure in the semiconductor switches according to a monitor output and, the diagnosis semiconductor switch and the semiconductor switch closest to the starter are brought into conduction for a short time to monitor a starter-side voltage of the semiconductor switch closest to the starter, and in one case where a voltage equal to or higher than a first predetermined voltage value is detected and a case where a voltage below a second predetermined voltage value is detected, the result of the diagnosis indicating that the starter is not allowed to restart is outputted to the outside.

11. A starter driving semiconductor switch apparatus that energizes and de-energizes a starter according to commands from an outside, comprising:

a plurality of semiconductor switches that are connected in series between a battery serving as a power supply and the starter;

driving circuits that are provided to the semiconductor switches in a one-to-one correspondence to drive the respective corresponding semiconductor switches;

a voltage monitor that monitors at least a starter-side voltage of a semiconductor switch closest to the starter in the plurality of semiconductor switches and a voltage between the plurality of semiconductor switches;

a current monitor that monitors a current flowing into the plurality of semiconductor switches;

a micro processor that makes a diagnosis on whether the starter is allowed to start and whether there is a failure in the semiconductor switches according to the commands, an output from the voltage monitor, and an output from the current monitor and outputs a diagnosis result to an ECU (Engine Control Unit);

an energization enable and disable determination circuit that outputs an energization enable and disable signal to the starter depending on whether a predetermined condition is satisfied according to the commands, an output to the micro processor, and an output from the current monitor; and drive circuits that are provided to the plurality of semiconductor switches in a one-to-one correspondence to drive the respective corresponding semiconductor switches according to an output signal of the micro processor and the energization enable and disable signal.

12. A starter driving semiconductor switch apparatus that energizes and de-energizes a starter according to commands from an outside, comprising:

a plurality of semiconductor switches that are connected in series between a battery serving as a power supply and the starter;
driving circuits that are provided to the semiconductor switches in a one-to-one correspondence to drive the respective corresponding semiconductor switches;
a voltage monitor that monitors a battery-side voltage of a semiconductor switch closet to the battery in the plurality of semiconductor switches, a starter-side voltage of a semiconductor switch closest to the starter, and a voltage between the plurality of semiconductor switches;
a micro processor that makes a diagnosis on whether the starter is allowed to start and whether there is a failure in the semiconductor switches according to the commands and an output of the voltage monitor and outputs a diagnosis result to an ECU (Engine Control Unit);
an energization enable and disable determination circuit that outputs an energization enable and disable signal to the starter according to the commands and an output of the micro processor;
drive circuits that are provided to the plurality of semiconductor switches in a one-to-one correspondence to drive the respective corresponding semiconductor switches according to an output of the micro processor and the energization enable and disable signal;
a diagnosis semiconductor switch that is connected between a battery side of the semiconductor switch closest to the battery in the plurality of semiconductor switches and a battery side of the semiconductor switch closest to the starter; and
a drive circuit that brings the diagnosis semiconductor switch together with the semiconductor switch closest to the starter into conduction for a short time by an output of the micro processor when a failure diagnosis is made.

13. A starter driving semiconductor switch apparatus that energizes and de-energizes a starter according to commands from an outside, comprising:
a plurality of semiconductor switches that are connected in series between a battery serving as a power supply and the starter;
a plurality of voltage monitors that respectively monitor a battery-side voltage of a semiconductor switch closest to the battery in the plurality of semiconductor switches, a starter-side voltage of a semiconductor switch closest to the starter, and a voltage between the plurality of semiconductor switches;
an output circuit that outputs a result of comparison between outputs of the plurality of voltage monitors and a predetermined determination voltage to an ECU (Engine Control Unit) as a failure diagnosis output;
drive circuits that are provided to the plurality of semiconductor switches in a one-to-one correspondence to drive the respective corresponding semiconductor switches according to the commands;
a diagnosis semiconductor switch that is connected between a battery side of the semiconductor switch closest to the battery in the plurality of semiconductor switches and a battery side of the semiconductor switch closest to the starter; and
a drive circuit that brings the diagnosis semiconductor switch together with the semiconductor switch closest to the starter into conduction for a short time according to one command from the outside and a diagnosis request signal from the ECU (Engine Control Unit) when a failure is diagnosed.

* * * * *